March 31, 1936. C. E. FARRINGTON 2,035,646
PAINT MIXER
Filed March 22, 1932
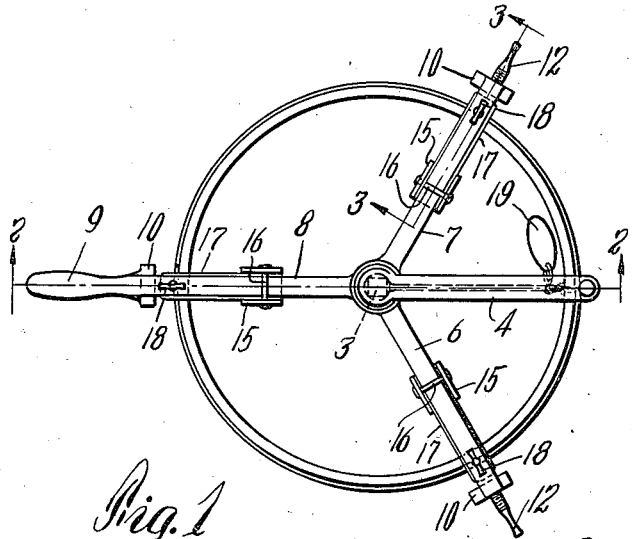
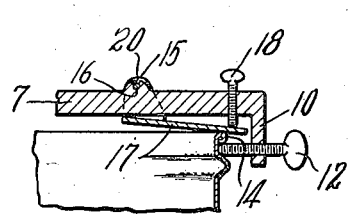
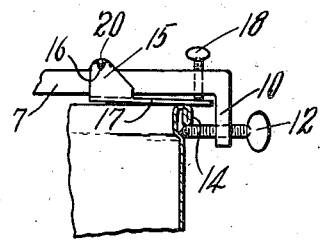
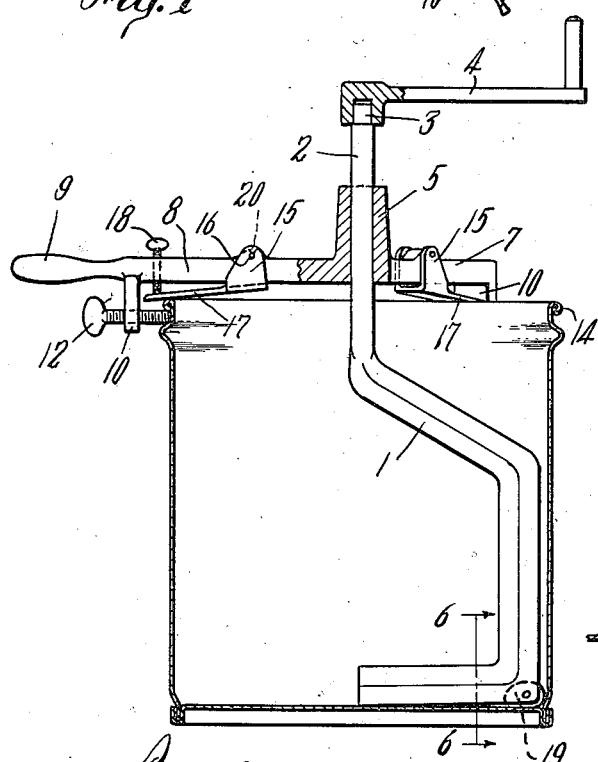
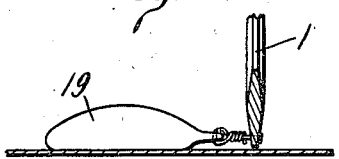
Inventor
Charles E. Farrington
Atty's Patented Mar. 31, 1936

2,035,646

UNITED STATES PATENT OFFICE 2,035,646

PAINT MIXER

Charles E. Farrington, Phoenixville, Pa.

Application March 22, 1932, Serial No. 600,392

6 Claims. (Cl. 259—108)

This invention relates to a stirring device or agitator adaptable for use in small containers of paints or similar liquids. It is intended for use primarily with a container having a capacity of approximately five gallons, which containers are used in tremendous quantities for transportation and dispensation of paints. The device hereinafter described is intended to be adaptable within its operating limits to any size or dimension of container or pail and to be rigidly secured in operation and is provided with means by which the container may be held firmly thus preventing slopping and spilling of its contents in the stirring and mixing operation. It is so designed as to permit its use with pails or containers having varying types of rims or lips and also to fit pails of varying diameter and height. It provides a means for actively and thoroughly mixing and agitating the contents of such pails for progressively engaging the caked solids in the lower portion of the pail by simple automatic vertical adjustment.

In the drawing

Fig. 1 is a top view of the stirring device attached to a container.

Fig. 2 is a side view partly broken away in section on the line 2—2 of Fig. 1, showing the container as attached to the ordinary form of paint pail, and including the holding handle.

Fig. 3 is a cross section along the lines 3—3 of Fig. 1, the details of the adjustable attaching screws in attached position.

Fig. 4 and Fig. 5 show the attaching screws applied to slightly different lips.

Fig. 6 is a section on line 6—6 of Fig. 2.

In the drawing a blade 1, the stirring portion of which is relatively flat and preferably diamond shaped in cross section, is shown having a lower portion adapted to rest on the bottom of the container from the center to the chime portion thereof, and having another portion extending vertically substantially half the length of the container and thence inclined inwardly toward the center. I have found that a blade roughly diamond shaped in cross section possesses marked advantages in its stirring operation, due to the creation of vortices both above and below the blade in its stirring action, and is much sturdier and less liable to bending than the conventional flat steel blade. From this portion of the blade a shaft 2 rises vertically terminating in a squared end as at 3. A crank 4 is provided with a square socket to fit on the squared end 3 for the rotation of the blade. The shaft 2 is elongated and is slidably journaled in a bearing member 5 permitting the blade to be raised and then lowered in use to permit the blade to work down through a deposit of caked solids in the lower portion of a can of paint. This adjustability I believe to be a new feature in this art as shown in connection with a unitary blade. The blade at its lower portion accordingly may contact with the bottom of containers of varying height and depths without adjustments other than the sliding of the shaft to adapt it to the height of the particular container in which it is used. To this end the vertical shaft portion 2 is preferably given considerable length. As shown in Figure 2, the length of the shaft portion 2 may be substantially more than half the vertical height of the entire stirring portion of the stirring member. The bearing member 5 may be in the form of a vertically bored boss having a set of arms 6, 7, 8 projecting radially therefrom, the boss and arms together constituting a supporting frame for the stirring member. As shown, these arms may be cast integral with the central boss. The arm 8 is longer than the others, the additional length being preferably in the form of a handle 9 which may be grasped to secure rigid control of the movement of the stirrer and the container in which it is used during the rotating of the blade member to effect the agitation of the contents.

As is well known, the pigment in paint tends to gravitate to the bottom forming a hard packed substance which is difficult to break up without the application of a considerable degree of force. The holding handle 9, in use, permits the user to securely hold the container while the blade is being rotated to effect a thorough agitation of the contents conveniently. Each arm of the frame is provided at its outer end with a downwardly extending portion 10 at right angles to the arm through which is passed a set screw 12 which is adapted to engage under the lip portion 14 of the container. As containers used for paint are customarily provided with a distinct lip or bead 14 which projects outwardly from the wall of the container, the arms may be held securely in place by the set screws. To ensure a more rigid holding of the set screws and to hold the frame against tilting, I have provided adapters shown in detail in the drawing. Each adapter consists of a flat strip 17 supported under a portion of one of the arms, and having a pair of ears 15 rising therefrom on either side of the arm. The ears 15 carry a pin 16 extending across the top of the arm 6, 7 or 8 to which the adapter is affixed in a groove 20 therein so that the strips 17 may rock on the pin 16 as an axis.

A set screw 18 is threaded through each arm so as to contact and press downwardly upon the outer end portion of the strip 17. In operation, the set screws 12 are first set up tight on each of the arms against the container just below the bead 14, the journal member 5 being thereby approximately centrally located. The set screws 18 are then set up to clamp the lip or bead 14 firmly between the inner ends of the set screws 12 and the corresponding strips 17, whereby a rigid firm holding of the frame is secured. By these means, the bearing member 5 is easily set up and rigidly secured in approximately the center of the container.

In fitting the device to the usual container the set screws 12 may be adjusted to vary the position of the bearing member 5 eccentrically to a limited extent, and by the vertical set screws 18, this position of the frame is effectively and rigidly secured, so that twisting out of position is prevented.

For using the stirrer in over-size containers, I provide a dangler 19 attached to the outer end of the horizontal portion of the blade. This dangler will effectively sweep into the chime corners of the container and stir up such settled pigment as might otherwise remain imbedded therein.

The herein described stirrer may be used on a pail of well settled paint as follows:

The cover having been removed from the container, the liquid portion of the contents may be partially or entirely poured into another container. The stirring device is then attached as described and is operated to scrape off progressively and mix up the upper layers of the settled pigment. When the upper portion has been scraped away from the remainder of the mass, some of the liquid may be returned and the further agitation of the upper portion of the remainder of the mass continued. Subsequent addition of small amounts of liquid may be made as successive portions of the mass are scraped loose and mixed. I have found that by breaking up the settled pigment in small quantities at a time and then pouring back into the container a part of the liquid which has been removed that the mixing is accomplished more efficiently and easily, and the noticeable and troublesome tendency of the mass to break into large lumps is avoided. Such lumps, when present in the full amount of liquid supplied in a paint container, are difficult to break up since they float about in the liquid and avoid the stirring paddle. It will be seen that in the operation of the device in this manner it is essential that the length of the shaft 2 be considerably greater than that of the bearing member in which it rotates. The length of the shaft makes it possible for the blade to be lowered gradually during rotation into the settled pigment from the top to the bottom thereof. By using the stirrer in this manner, wasteful and inefficient stirring may be avoided, and the paint may quickly be made ready for use with its ingredients thoroughly mixed in correct proportions.

I claim:

1. In combination with a container having a beaded upper rim, a stirring device comprising a frame having members resting on said rim, set screws on the frame members adapted to engage the outside of the container immediately below said rim, and adjustable means carried by the frame for clamping said screws laterally upward against said beaded rim.

2. In combination with a container having a beaded upper rim, a stirring device comprising a frame having radial members resting on said rim, set screws on the frame member engaging the outside of said container immediately below said rim, and adapters adjustably pressing said screws laterally against said rim.

3. A stirring device for a container having a beaded upper rim, said device comprising a central boss having a bore therethrough, a plurality of arms projecting radially from said boss, each arm having a downwardly extending end portion, a screw passing inwardly through such downward extending portion and adapted to press against such container below the rim thereof, a second screw passing downwardly through each said arm inward of said downward extending portion, a clamping element rockably mounted at one end under each arm, the free end of said element being engageable by said second screw to press said element downwardly against the upper edge of said container, and a stirring member journaled in said boss.

4. In combination with a container having a beaded upper rim, a stirring device comprising a frame having radial members resting on said rim, set screws on the frame members engaging the outside of said container immediately below said rim, and adapters adjustably pressing said screws laterally against said rim, one of said radial members being elongated in the form of a handle.

5. A stirring device for a container having a beaded upper rim, said device comprising a central boss having a bore therethrough, a plurality of arms projecting radially from said boss, each arm having a downwardly extending end portion, a screw passing inwardly through such downward extending portion and adapted to press against such container below the rim thereof, a second screw passing downwardly through each said arm inward of said downward extending portion, a clamping element rockably mounted at one end under each arm, the free end of said element being engageable by said second screw to press said element downwardly against the upper edge of said container, and a stirring member journaled in said boss, the stirring portion of said member being diamond shaped with vertical cutting edges.

6. A stirring device for a container having a beaded upper rim, said device comprising a central boss having a bore therethrough, a plurality of arms projecting radially from said boss, each arm having a downwardly extending end portion, a screw passing inwardly through such downward extending portion and adapted to press against such container below the rim thereof, a second screw passing downwardly through each said arm inward of said downward extending portion, a clamping element rockably mounted at one end under each arm, the free end of said element being engageable by said second screw to press said element downwardly against the upper edge of said container, and a stirring member journaled in said boss, said member having an axis portion of considerably greater length than the journal bearing in said boss.

CHARLES E. FARRINGTON.